April 28, 1970   L. A. B. PILKINGTON   3,509,011
MANUFACTURE OF FLAT GLASS
Original Filed June 7, 1957   2 Sheets-Sheet 2
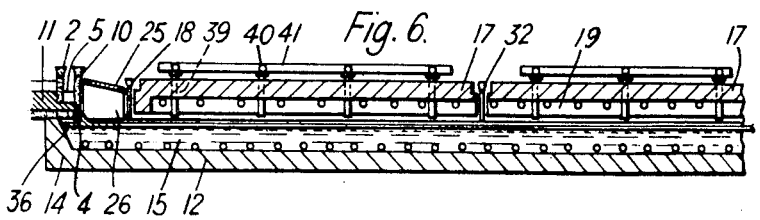
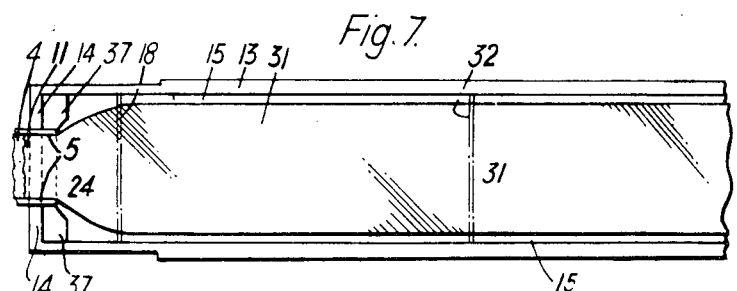
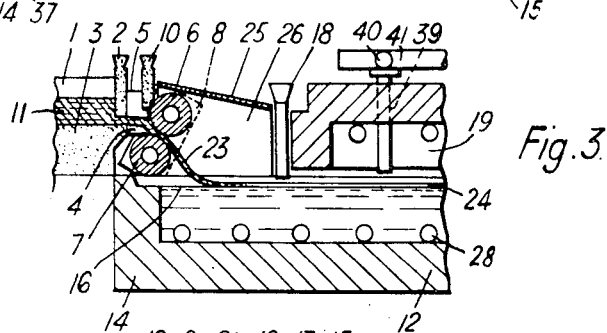
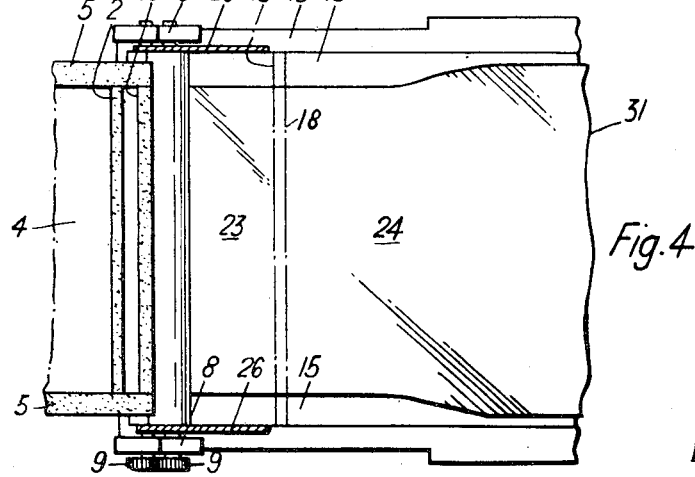
Inventor
Lionel A B Pilkington
By
Morrison, Kennedy & Campbell
Attorneys United States Patent Office 3,509,011
Patented Apr. 28, 1970

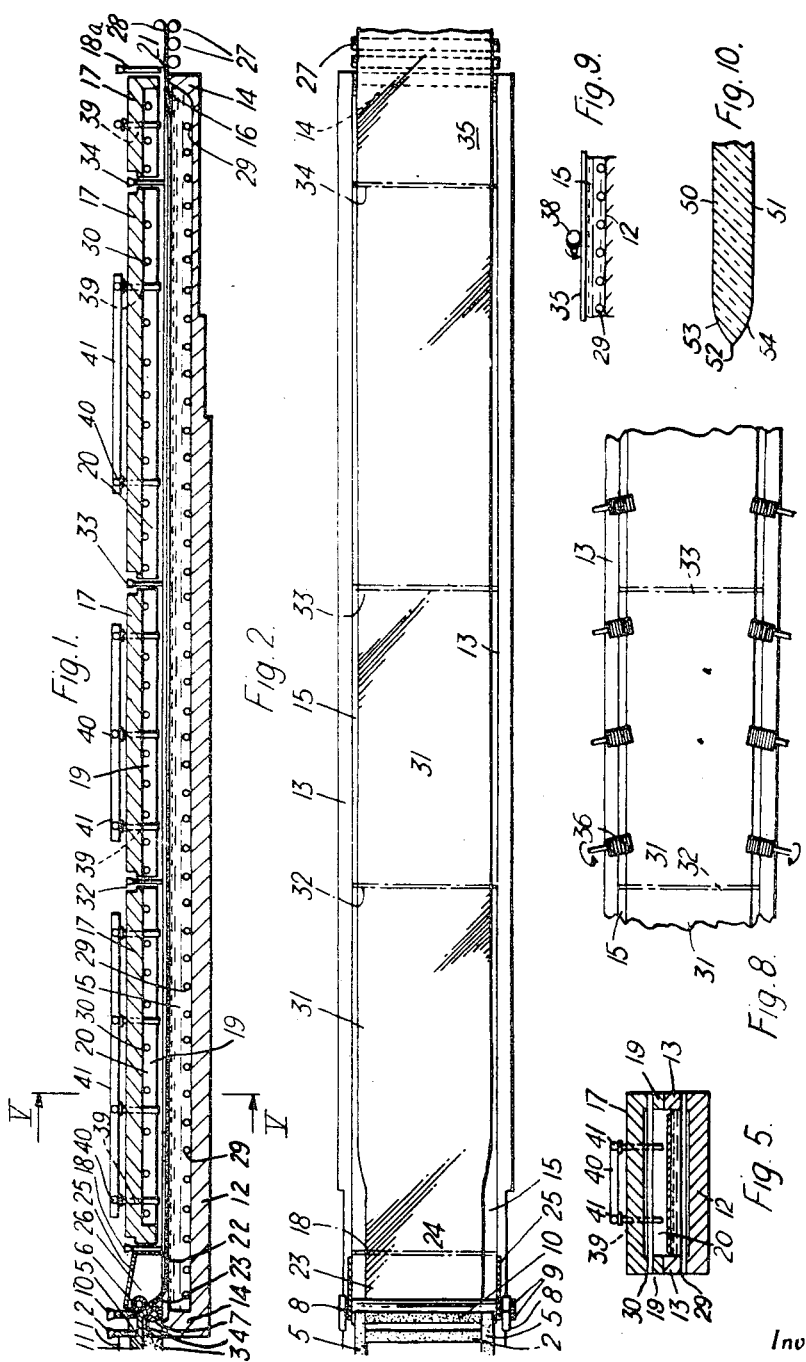

3,509,011
MANUFACTURE OF FLAT GLASS
Lionel Alexander Bethune Pilkington, Rainhill, England, assignor to Pilkington Brothers Limited, Liverpool, England, a company of Great Britain
Original application June 7, 1957, Ser. No. 664,245, now Patent No. 3,083,551, dated Apr. 2, 1963. Divided and this application Dec. 27, 1961, Ser. No. 162,545
Claims priority, application Great Britain, May 3, 1957, 14,205/57
Int. Cl. C03b 18/00; B32b 17/00
U.S. Cl. 161—164                    1 Claim This invention relates to the manufacture of flat glass and is a division of copending application Ser. No. 664,245 filed June 7, 1957, which has now matured into Patent No. 3,083,551, dated Apr. 2, 1963.

The aforesaid copending application discloses and claims a method of manufacturing flat glass which comprises the steps of delivering glass at a controlled rate to a bath of molten metal and advancing the glass along the surface of the bath under thermal conditions which assure that a layer of molten glass is established on the bath, maintaining said glass layer in molten condition until there is developed on the surface of the bath a buoyant body of molten glass of stable thickness by permitting said layer of molten glass to flow laterally unhindered to the limit of its free flow under the influence of gravity and surface tension, and thereafter continuously advancing the buoyant body in ribbon form along the bath and sufficiently cooling this ribbon as it is advanced to permit it to be taken undamaged out of the bath by mechanical means.

Accordingly in carrying out the invention described in the copending application at least the edges of the molten layer which are contiguous to the molten body of stable thickness, as well as the edges of the molten body which has flowed to stable thickness are unhindered in their movement over the bath whether the molten glass is spreading in achieving the lateral flow or whether the width dimension of the molten glass is being progressively reduced during the development of molten glass of stable thickness.

The temperature at which a molten glass body of stable thickness, or substantially so, in accordance with the aforesaid invention is completed varies with the composition of the glass. For the soda-lime compositions of plate and sheet glasses the development of the stable body of molten glass may be achieved above 850° C., that is to say at a temperature at which the viscosity of the glass is low enough for the surface tension and gravitational forces to cause the glass to flow.

Experiments have shown that at elevated temperatures e.g. 900° C. or over, a buoyant (freely floating) body of molten glass supported on a bath of a molten metal automatically achieves a condition of stable thickness, if it is permitted to flow laterally on the bath without constraint, the stable thickness being achieved when the lateral flow ceases, i.e. when equilibrium has been established, or substantially so, between the forces of surface tension of the molten glass and the molten metal and the forces of gravity, and that the glass in the stable body is of specific and uniform thickness except near the edges, the surfaces being free of distortion.

At the sides of the ribbon, due to combatant forces of surface tension and of gravity and the circumstance that the molten glass is permitted unhindered lateral flow to the limit of its free flow under the influence of gravity and surface tension, the glass progressively conforms to the shape predicated by the state of the conflict between the forces until a state of equilibrium is established at which time there is formed at each side of the ribbon a single edge each said edge lying between the planes containing the flat surface of the ribbon, each said edge defining the junction of upper and lower convex faces emerging respectively from the upper and lower surfaces of the ribbon all the surfaces of the ribbon having a similar finish. Accordingly a fine finish on the flat faces will extend over the confluent convex faces.

In order that the invention may be more clearly understood, reference will now be made to the accompanying diagrammatic drawings which show, by way of example, preferred embodiments thereof.

In the drawings:

FIG. 1 is a central longitudinal sectional elevation of apparatus, comprising a tank structure for a bath of molten metal and a superimposed roof structure, in which apparatus the glass delivered to the bath is fed in ribbon form;

FIG. 2 is a plan view of the tank structure of the apparatus shown in FIG. 1;

FIGS. 3 and 4 are detail views to a larger scale but correspond to FIGURES 1 and 2 respectively, more clearly showing the means of forming and feeding a ribbon of glass to the molten bath;

FIG. 5 is a transverse sectional elevation taken on the line V—V of FIG. 1;

FIG. 6 and FIG. 7 are part sectional elevation and plan views corresponding respectively to FIGS. 1 and 2 showing a modified method of delivering glass to the bath of molten metal;

FIG. 8 is a detail plan view of a further modified form of apparatus according to the invention showing the employment of transverse pairs of edge rolls engaging on plastic glass of stable thickness in ribbon form which eventually emerges as a stiffened ribbon from the bath of molten metal;

FIG. 9 is a detail drawing of one of the edge rolls engaging the plastic glass in ribbon form, and FIG. 10 is a detail fragmentary drawing to a larger scale showing the ribbon form near the edges.

In the drawings like references designate the same or similar parts.

Referring first to the construction shown in FIGS. 1 to 5 a forehearth of a continuous glass melting tank is indicated at 1, the regulating tweel at 2 and the spout at 3, the spout comprising a floor or "lip" 4 and side jambs 5, one of which only is illustrated in FIG. 1, the side jambs and lip forming a spout of generally rectangular cross-section. In known manner, a cover may be secured over the spout.

Operatively associated with the spout are a pair of water-cooled casting rolls, the upper of which is indicated at 6 and the lower casting roll at 7 mounted in frames 8, 8 in usual manner and driven through tooth wheels 9, 9 by power means. A gate 10 is adjustably suspended in known manner (by means not shown) in a vertical plane in contiguity with the casting roll 6. The gate 10 shields the top roller 6 from the heat radiated by the molten glass 11 flowing from the forehearth over the lip 4 to the pass between the rolls 6, 7.

The upper casting roll 6 is disposed in advance of the lower casting roll 7 so that the molten glass 11 flows from the lip floor on to an upper part of the roll 7 presenting to the glass a downwardly and forwardly directed arcuate casting bed moving in the same sense as the direction of flow from the spout, thus the molten glass on leaving the spout and arriving on this casting bed is constrained to flow forwardly thereby preventing backward flow of the molten glass leaving the spout 4.

The conventional ribbon forming means just described may be disposed over the floor 12 of a tank structure, including side walls 13 joined together by end walls 14, 14 integral with the side walls and with the floor, which tank structure confines a bath 15 of molten tin, the level of the surface of which bath is indicated at 16.

The configuration of the tank illustrated is such that the distance between the side walls 14, 14 is at every point along the bath wider than the width of the glass on the bath.

This tank structure supports a roof structure including a roof 17, a vertically adjustable end wall 18 and side walls 19 (see FIG. 2), so that the roof structure provides a tunnel over the bath 15 and defines a headspace 20.

The adjustable end wall 18 of the roof structure at the discharge end and the corresponding end wall 14 of the tank structure form between them a narrow outlet 21 from the bath, the end wall 18 adjacent the casting rolls 6, 7 being also adjusted to form a narrow inlet 22 for the ribbon 23, as the ribbon is advanced under the roof structure by the ribbon forming means.

Outside the discharge end of the tank is mounted mechanical conveying means, exemplified by driven rollers 27 disposed somewhat above the level of the bottom of the outlet 21, and superimposed driven rollers 28; the rollers 27 and 28 co-operate to apply a tractive effort to the ribbon of glass moving towards the outlet, which tractive effort assist in advancing the glass along the bath. The ribbon passes out of the bath on the rollers 27, which rollers direct this ribbon to a conventional tunnel lehr (not shown).

Between the ribbon forming rolls 6, 7 and the adjustable wall 18 an extension of the roof structure is provided, this extension forming a chamber enclosing the ribbon forming means; the chamber comprising a ceiling 25 and side walls 26 carried by the side walls 13 of the tank structure.

The temperature of the bath in the tank structure is regulated from the inlet end to the discharge end by providing thermal regulators, indicated at 29, immersed in the molten metal. The headspace 20 over the bath is preferably heated by radiant heat directed downwardly from the roof, and to this end heaters 30 may be mounted in the roof.

The thermal regulators 29, 30 at the entry end of the apparatus are devised to maintain a temperature of about 1,000° C. or slightly higher over a sufficient length of the bath to transform the ribbon 23 into a buoyant layer of molten glass 24 having a viscosity low enough for the surface tension and gravitational force to cause the glass to flow so that there is developed from the layer a buoyant body 31 of molten glass of stable thickness.

This length of the bath is defined between a tweel 32 and the end wall 18 at the entry end of the structure, and the thermal regulators in the roof and tank structures disposed between the tweel 32 and the end wall 18 at the discharge end of the apparatus are controlled so that the molten glass of stable thickness in ribbon form which has passed under the tweel 32 is progressively cooled from there to the discharge end.

To assist the regulation of the temperature between the tweel 32 and the discharge end, other tweels 33 and 34 may be provided in the roof structure so as to further partition the headspace 20 over the bath. For example, a suitable temperature gradient of descending values may be achieved by adjusting the temperature regulators 29 and 30 so that the temperature of the bath under the headspace up to the tweel 32 is about 1,000° C., and between the tweel 32 and the tweel 33 descends to 825° C., and between the tweel 33 and the tweel 34 further descends to a temperature at which the ribbon surface has been sufficiently stiffened to allow its transfer to a lehr on mechanical conveying means without detriment to the surfaces, e.g. a temperature (about 650° C.) at which the viscosity is about $10^7$ poises.

As clearly shown in FIGURE 2 of the drawings, the ribbon 23 fed to the bath has a width somewhat less than that which is drawn from the outlet end, but is slightly thicker than the intended thickness for the ultimate ribbon which is indicated at 35.

Thus by predetermining the dimensions of the ribbon fed to the bath, i.e. the ribbon formed between the casting rolls 6, 7, and the rate of rolling, a buoyant body of molten glass of stable thickness is constantly maintained, the rate of discharge being substantially the same as the rate of rolling, and it will be observed that the width of the bath in the tank structure is such that the surface of the molten metal forming the bath is exposed on each side of the edges of the ribbon 23 of the layer of molten glass 24 formed therefrom and of the body 31 of molten glass of stable thickness developed from the layer of molten glass 24. Accordingly the molten glass in the layer 24 and in the body 31 is buoyant so that the molten glass in the layer 24 is free to progressively flow across the bath to develop the body of stable thickness on the bath, the body of stable thickness being fully developed when equilibrium has been established or substantially so, between the forces of surface tension of the molten glass and the molten metal, and the forces of gravity.

In creating the condition of equilibrium in the molten glass any distortion in a mechanically formed ribbon e.g. the ribbon 23 delivered to the bath, entirely disappears and a body of molten glass which has assumed level formation is developed, from which body is produced a ribbon of glass of uniform thickness free of distortion and having a fire finish.

The horizontal ribbon produced on the bath consists of parallel flat faces and edge surfaces each constituted by meeting upper and lower convex faces of equal area and confluent respectively with the upper and lower flat surfaces of the ribbon, the ribbon surfaces and the surfaces of each edge having a fire finish.

The ultimate ribbon thus produced will have a thickness predicated by the formation of the buoyant body 31 of molten glass of stable thickness, i.e. in a state of equilibrium, and the width of that body.

Instead of regulating the delivery of glass to the bath by feeding a ribbon of glass to the bath, glass in molten form may be supplied from the spout of a forehearth. Such a construction is exemplified in FIGS. 6 and 7 and in such construction the function of the gate 10 is to afford a constant regulation of the flow of the molten glass from the spout lip 4; thus the flow is controlled by the regulating tweel 2 and the gate 10.

As clearly indicated in FIG. 6, the spout, is vertically spaced from the surface of the bath 15 so that molten glass has a free fall of a few inches to the bath, and the distance is such as to ensure a heel 36 being formed behind the glass flowing to the bath which heel is extended rearwardly under the spout lip 4 to the end wall 14.

The molten metal of which the bath is constituted is at the entry end to each side of the heel covered by a tile 37 which extends from the end wall 14 forwardly of the spout lip 4, the heel wetting the end wall 14 between the tiles so that the surface of the bath under the spout which would otherewise be exposed is protected against access thereto of outside air. The molten glass flowing from the spout thus flows over the spout lip 4 forwardly on to the bath on which the glass is advanced.

As clearly shown in FIG. 7, the spout is preferably of a width which is about half the width of the buoyant body 31 of stable thickness formed between the tweels 18 and 32. On leaving the spout the glass forms a buoyant molten layer indicated at 24 on the bath having a viscosity low enough for the surface tension and gravitational forces to cause the glass to flow laterally across the bath until the buoyant body 31 of stable thickness is developed therefrom by the maintenance of a temperature of 1,000° C. or more, in that part of the bath between the tweels 18 and 32.

As in operating the apparatus illustrated in FIGS. 1–5 the ultimate ribbon 35 produced by the apparatus in FIGS. 6 and 7 from the buoyant body 31 of stable thickness will have the same dimensions as the latter body.

However, in either form of apparatus described the thickness of the ribbon produced from the buoyant body of stable thickness may be modified by increasing the speed of the rolls 27, 28 thereby modifying the traction effort to attenuate the glass body of stable thickness 31 as it is advanced in ribbon form along the bath. By using transverse pairs of horizontally disposed edge rolls indicated at 36 (FIGS. 8 and 9) acting only on the upper surface of the plastic glass, a ribbon can be produced at the discharge end which has a width which is equal to the width of the buoyant body of the molten glass of stable thickness but is not so thick as the stable body.

The optimum disposition of the transverse pairs of edge rolls 36 is in general indicated in FIG. 8 by reference to the position of the tweels 32, 33.

In the manufacture of flat glass on a bath of molten metal as hereinbefore described there is produced on the molten bath 15 in the confining tank, disposed in advance of the means delivering glass at a controlled rate to the bath, a horizontal flat ribbon of glass having parallel flat upper and lower surfaces.

The ribbon of glass so produced has surfaces of a lustre equivalent to that known as fire finish—though unground and unpolished and the glass is free from internal stress and the surfaces free from distortions and imperfections. As clearly illustrated in FIGURE 10, the ribbon of glass comprises upper and lower parallel surfaces indicated at 50 and 51 and a single linear edge 52 at each side of the ribbon, each linear edges 52 lie in a plane between the planes containing the surfaces 50 and 51.

As the lower convex face is formed at a point where the glass is in contact with the molten tin and the upper convex face is formed where the glass is in contact with the air, the upper marginal face is less convex than the lower marginal face.

Each edge 52 defines the junction of upper and lower convex faces 53 and 54 at the respective sides of the ribbon and which emerge respectively from the flat surfaces 50, 51 as a state of equilibrium is approaching between the forces of surface tension and gravity acting on the buoyant low viscosity molten glass as lateral flow to the limit of its free flow capacity takes place. All the surfaces 50, 51, 53, 54 having a fire finish. The form of the convex faces 53 and 54 graph the progressive battle of the forces towards the state of equilibrium and it will be observed therefore that the curvature of the surfaces 53 and 54 have a radius which is greater than the thickness of the ribbon.

In the apparatus shown in FIGS. 1–5 and in the apparatus shown in FIGS. 6 and 7, the roof structure is at intervals provided with ducting 39 connected by branches 40 to headers 41 through which a protecting gas is fed into the headspace 20 of the structure at a rate to create a plenum in the headspace. The protecting gas is a gas which will not chemically react with tin to produce contaminants of the glass as for example a tin oxide or a tin sulphide. Conveniently ordinary commercial coal gas can be supplied through the ducting 39 to afford a non-oxidising atmosphere, and by providing a plenum, ingress to the headspace 20 of atmospheric air is prevented. By introducing the gas the bath is protected against oxidation by covering the bath against the formation of contaminants of the glass and in particular precluding the presence of contaminants at the interface between the glass and the bath.

The heaters may be sectionalised so as to extend for predetermined lengths along the bath corresponding to the distance between the tweels and provided with heaters so that the temperature of the protecting gas entering the headspace may be precisely regulated, as will be well understood.

Further, in constructions such as are shown in FIGS. 1 to 5, the protecting gas fed to the headspace 20 can be admitted either by pipes (not shown) to the chamber, defined by the ceiling 25 and side walls 26, or by adjusting the tweel 18 so that an atmosphere of the protecting gas is maintained in this chamber.

As regards the construction illustrated in FIGS. 6 and 7, the chamber provides a means of maintaining a sufficient volume of the protecting gas over that part of the bath exposed to each side of the molten glass in the chamber.

From the foregoing it will be appreciated that the present invention comprises as a new article of manufacture, flat glass the whole of the surfaces of which have a lustre equivalent to that known as "fire-finish," said glass being of uniform thickness and substantially free of surface distortions without grinding.

In particular, the present invention comprises as a new article of manufacture, flat glass having a lustre equivalent to that known as "fire-finish" produced in accordance with the methods of operation herein described.

The flat glass in ribbon form is in practice an intermediate product from which sheets will be cut and sold in commerce.

It will also be appreciated that as the convex faces 53, 54 are both between the parallel planes containing the flat faces 50, 51, that any subsequent operation on the ribbon can be effected as soon as the ribbon emerges from the lehr.

I claim:
1. A sheet of glass cut from a ribbon of glass produced by delivering glass at a controlled rate to a bath of molten metal and advancing the glass along the surface of the bath under thermal conditions which assure that a layer of molten glass is established on the bath, maintaining said glass layer in molten condition until there is developed on the surface of the bath a buoyant body of molten glass of stable thickness by permitting said layer of molten glass to flow laterally unhindered to the limit of its free flow under the influence of gravity and surface tension, and thereafter continuously advancing the buoyant body in ribbon form along the bath, and sufficiently cooling this ribbon as it is advanced to permit it to be taken undamaged out of the bath by mechanical means.

References Cited

UNITED STATES PATENTS

| 710,357 | 9/1902 | Heal | 65—182 XR |
| 2,167,905 | 8/1939 | Pedersen et al. | 161—64 |

OTHER REFERENCES

Tooley Handbook of Glass Manufacture, published by Ogden Publishing Co. (New York) 1953, vol. 1, pp. 391–420.

WILLIAM J. VAN BUREN, Primary Examiner

U.S. Cl. X.R.

65—65, 99; 161—166